(12) United States Patent
Hong et al.

(10) Patent No.: US 9,756,475 B2
(45) Date of Patent: Sep. 5, 2017

(54) MOBILE TERMINAL AND METHOD FOR CONTROLLING PLACE RECOGNITION

(71) Applicants: Samsung Electronics Co., Ltd., Gyeonggi-do (KR); Industry-Academic Cooperation Foundation, Yonsei University, Seoul (KR)

(72) Inventors: Hyun-Su Hong, Gyeonggi-do (KR); Sung-Bae Cho, Seoul (KR); Jeong-Gwan Kang, Gyeonggi-do (KR); Nam-Hoon Kim, Gyeonggi-do (KR); Young-Seol Lee, Seoul (KR); Yong-Joong Kim, Seoul (KR); Si-Hyuk Yi, Seoul (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 215 days.

(21) Appl. No.: 14/334,076

(22) Filed: Jul. 17, 2014

(65) Prior Publication Data

US 2015/0024780 A1    Jan. 22, 2015

(30) Foreign Application Priority Data

Jul. 17, 2013    (KR) ......................... 10-2013-0084244

(51) Int. Cl.
*H04W 4/02*    (2009.01)

(52) U.S. Cl.
CPC .................................. *H04W 4/028* (2013.01)

(58) Field of Classification Search
CPC ....... H04W 64/00; H04W 4/028; H04W 4/02; H04W 60/005; H04W 60/02; H04W 8/005; H04W 8/02; H04W 8/04; H04W 8/06; H04W 60/04; H04W 64/006; H04W 52/28; H04W 4/021; H04W 4/025; H04W 4/005;
(Continued)

(56) References Cited

U.S. PATENT DOCUMENTS

| 8,073,460 | B1 * | 12/2011 | Scofield | ................. | G06Q 30/02 |
| | | | | | 455/456.1 |
| 8,340,695 | B2 * | 12/2012 | Song | .................... | H04W 4/185 |
| | | | | | 455/457 |

(Continued)

FOREIGN PATENT DOCUMENTS

| KR | 1020090091330 | 8/2009 |
| KR | 1020090131962 | 12/2009 |

(Continued)

*Primary Examiner* — Meless Zewdu
(74) *Attorney, Agent, or Firm* — The Farrell Law Firm, P.C.

(57) ABSTRACT

A mobile terminal and method for controlling place recognition are provided. The method includes collecting at least one of state information about a mobile terminal and user information stored in the mobile terminal, determining whether a current place of the mobile terminal is a major place that the user has previously visited at least a number of times using the collected information, determining, if it is determined that the current place of the mobile terminal is a major place, whether the current place has been registered using at least one signal received externally, and outputting a result of the determination as to whether the current place has been registered.

16 Claims, 9 Drawing Sheets

(58) Field of Classification Search
CPC ......... H04W 4/00; H04W 4/003; H04W 4/12; H04W 60/00; H04W 40/20; H04W 48/04; H04W 48/14; H04W 28/0226; H04W 24/10; H04W 4/026; H04W 4/027; H04W 4/04; H04W 4/043
See application file for complete search history.

(56) References Cited

U.S. PATENT DOCUMENTS

| | | | | |
|---|---|---|---|---|
| 8,364,120 | B2* | 1/2013 | Kuhlman | H04L 63/10 455/411 |
| 8,725,569 | B2* | 5/2014 | Liang | H04W 4/02 705/14.66 |
| 2008/0147311 | A1 | 6/2008 | Zoller et al. | |
| 2009/0005987 | A1* | 1/2009 | Vengroff | G06Q 30/02 701/300 |
| 2009/0163224 | A1 | 6/2009 | Dean et al. | |
| 2009/0216732 | A1* | 8/2009 | Feng | G01C 21/3611 |
| 2010/0030465 | A1* | 2/2010 | Solkesz | G01C 21/20 701/533 |
| 2010/0041378 | A1* | 2/2010 | Aceves | H04L 67/306 455/414.1 |
| 2010/0070334 | A1* | 3/2010 | Monteverde | G06F 17/30241 705/14.58 |
| 2011/0294515 | A1* | 12/2011 | Chen | G01S 5/0252 455/456.1 |
| 2011/0300875 | A1* | 12/2011 | Kim | G01S 19/16 455/456.1 |
| 2012/0135750 | A1* | 5/2012 | Lee | G01C 21/165 455/456.1 |
| 2013/0079031 | A1* | 3/2013 | Kuhn | H04W 4/043 455/456.1 |
| 2014/0074873 | A1* | 3/2014 | Ngo | G06F 17/30241 707/758 |
| 2014/0236669 | A1* | 8/2014 | Milton | G06Q 30/0201 705/7.29 |
| 2015/0025838 | A1* | 1/2015 | Yamada | H04W 64/006 702/150 |

FOREIGN PATENT DOCUMENTS

| | | |
|---|---|---|
| KR | 1020100063835 | 6/2010 |
| KR | 1020100106499 | 10/2010 |

* cited by examiner

MOBILE TERMINAL AND METHOD FOR CONTROLLING PLACE RECOGNITION

PRIORITY

This application claims priority under 35 U.S.C. §119(a) to a Korean Patent Application filed in the Korean Intellectual Property Office on Jul. 17, 2013 and assigned Serial No. 10-2013-0084244, the entire disclosure of which is incorporated herein by reference.

BACKGROUND OF THE INVENTION

1. Field of the Invention

The present invention relates generally to a mobile terminal, and more particularly, to a mobile terminal and method for controlling place recognition.

2. Description of the Related Art

Mobile terminals have evolved to provide various services and functions. To increase the utilization of the mobile terminals and satisfy various users' demands, a variety of applications have been developed for execution in the mobile terminals.

Therefore, hundreds of applications can be stored and displayed on a touch screen in a mobile terminal such as a smartphone, a portable phone, a laptop Personal Computer (PC), or a tablet PC. The mobile terminal and the applications are controlled in accordance with a touch on or hovering over the touch screen made by an input unit such as a finger, an electronic pen, or a stylus pen. The mobile terminal can detect its location by the Global Positioning System (GPS).

Location recognition techniques include outdoor and indoor location recognition. The outdoor location recognition relies mainly on GPS. Many techniques using infrared communication have been developed for indoor location recognition, such as Bluetooth®, a Radio Frequency Identification (RFID) tag, and Wireless Fidelity (WiFi) Access Point (AP). A drawback with such indoor location recognition techniques is that many preparations and devices (for example, an infrared communication device, setting of places for recognition of an RF ID tag and installation of tags in the places, and installation of Bluetooth® devices at respective locations) are required for places to be recognized.

The indoor location recognition technique using a Wireless Fidelity (WiFi) Access Point (AP) obviates the need for installing equipment in advance because a sufficient number of APs have already been installed in an urban area under a wireless communication-enabled environment. Thus, methods for recognizing a place based on the strength or response time of a WiFi signal have been developed. These methods include trilateration and finger printing. The finger printing is more popular, as it tends to increase the accuracy of place recognition.

The WiFi-based location recognition technique requires a set of training data to learn a model for recognizing a user's place. To build the training data, every place should be segmented into grids each having a predetermined size, and information about the strength of a WiFi signal at the center of every grid should be collected. Performing this operation for every indoor place that a user visits is not practical, and an increase in the number of visited places also increases the size of a signal strength data set. This increases the time for place recognition.

Moreover, the place recognition method of the related art requires labeling of every user-visited place meter by meter, which consumes time and is cumbersome. Since a user selects a place to visit, the names of major places are ignored and thus are not stored. If a user visits a number of places, the size of a database increases significantly, thereby increasing a processing time for place recognition.

Accordingly, there is a need in the art for a method of determining whether a user currently visits a major place, using at least one of state information about a mobile terminal and user information in a mobile environment, receiving at least one signal from a signal transmission device such as a WiFi AP, if the user currently visits a major place, and automatically collecting and learning GPS information about the place, so that when the user revisits the place, the place may be automatically recognized.

SUMMARY OF THE INVENTION

An aspect of the present invention is to address at least the above-mentioned problems and/or disadvantages and to provide at least the advantages described below. Accordingly, an aspect of the present invention is to provide a mobile terminal and method for controlling place recognition.

Another aspect of the present invention is to provide a method for designing a model with which to determine whether a user currently visits a major place based on various information collectable by a mobile terminal, and automatically recognizing the place when the user revisits the place.

In accordance with an aspect of the present invention, there is provided a method for controlling place recognition in a mobile terminal, including collecting at least one of state information about the mobile terminal and user information stored in the mobile terminal, determining whether a current place of the mobile terminal is a major place using the collected information, if it is determined that the current place of the mobile terminal is a major place, determining whether the current place has been registered using at least one signal received from surroundings, and outputting a result of the determination as to whether the current place has been registered.

In accordance with another aspect of the present invention, there is provided a mobile terminal for controlling place recognition, including a sensor module configured to sense a state of the mobile terminal, a controller configured to collect at least one of state information representing the sensed state of the mobile terminal and user information stored in the mobile terminal, determine whether a current place of the mobile terminal is a major place using the collected information, and determine whether the current place has been registered using at least one signal received from surroundings, and a touch screen configured to output a result of the determination as to whether the current place has been registered.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE INVENTION

The following description with reference to the accompanying drawings is provided to assist in a comprehensive understanding of embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for the sake of clarity and conciseness.

The terms and words used in the following description and claims are not limited to their dictionary meanings, but are merely used to enable a clear and consistent understanding of the disclosure. Accordingly, it should be apparent to those skilled in the art that the following description of embodiments of the present invention is provided for illustration purposes only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Terms used in the present invention will first be defined below.

Mobile terminal: A device that can be carried by a user, or worn around a user's body part such as the wrist, ankle, or waist, that has communication functionalities of data transmission and voice and video calls, and that includes at least one touch screen.

Input unit: At least one of a finger, an electronic pen, a digital pen, a pen without an Integrated Circuit (IC), a pen with an IC, a pen with an IC and a memory, a pen capable of short-range communication, a lollol pen for reading text, a joystick, a stylus pen, which can enter a command or an input to a mobile terminal by touching a touch screen or hovering over the touch screen in a non-contact manner.

Figure 1:
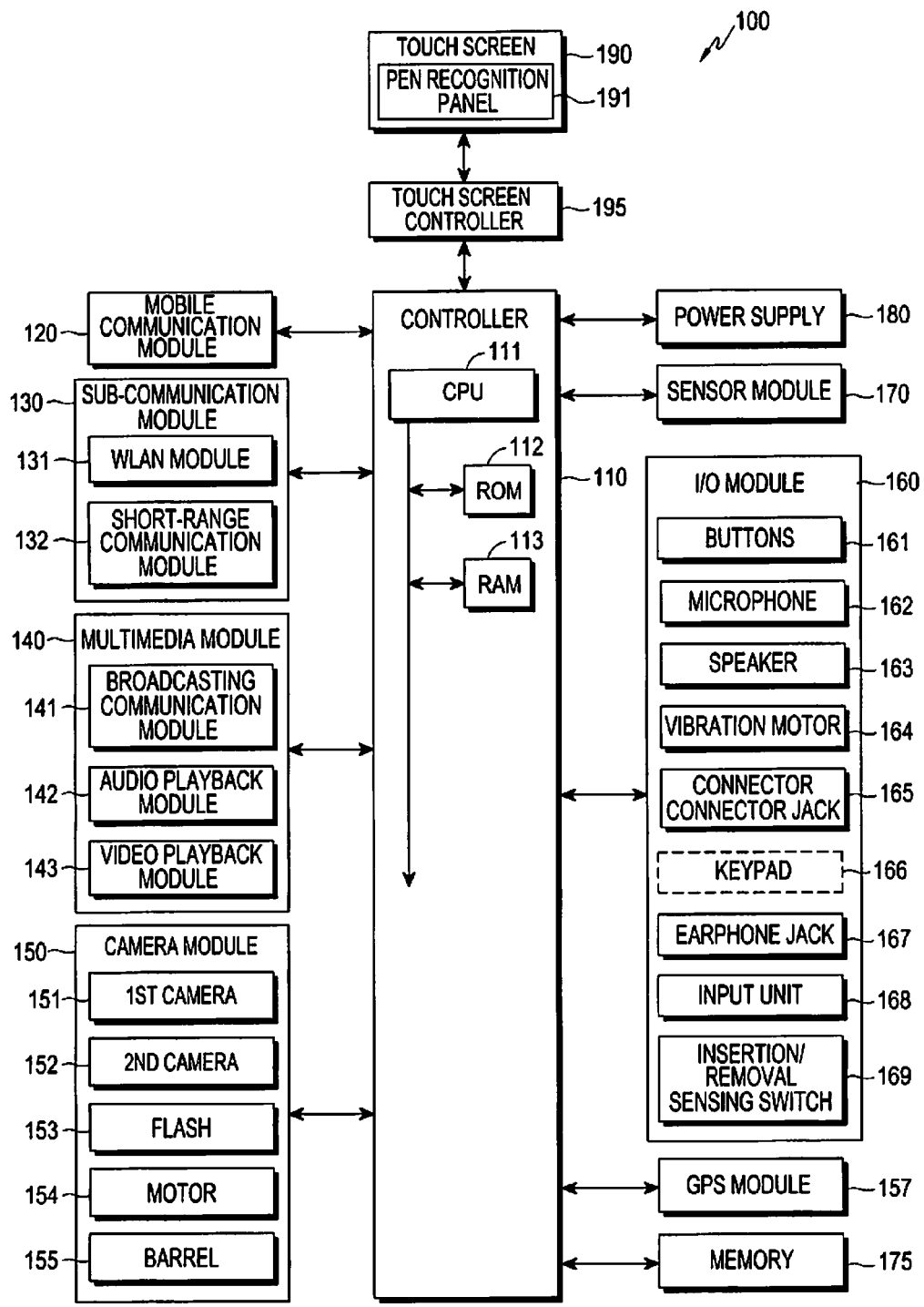
FIG. 1 illustrates a mobile terminal according to an embodiment of the present invention.

FIG. 1 illustrates a mobile terminal according to an embodiment of the present invention.

Referring to FIG. 1, the mobile terminal 100 may be connected to an external device (not shown) through at least one of a mobile communication module 120, a sub-communication module 130, a connector 165, and an earphone connector jack 167. The term 'external device' covers a variety of devices that can be detachably connected to the mobile terminal 100 by wire, such as an earphone, an external speaker, a Universal Serial Bus (USB) memory, a charger, a cradle, a docking station, a Digital Multimedia Broadcasting (DMB) antenna, a mobile payment device, a health care device (for example, a blood sugar meter), a game console, or a vehicle navigator. The 'external device' may also include a device wirelessly connectable to the mobile terminal 100 by short-range communication, such as a Bluetooth® communication device, a Near Field Communication (NFC) device, a Wireless Fidelity (WiFi) Direct communication device, and a wireless Access Point (AP). In addition, the mobile terminal 100 may be connected to another device by wire or wirelessly, such as a portable phone, a smartphone, a tablet PC, a desktop PC, and a server.

Referring to FIG. 1, the mobile terminal 100 includes at least one touch screen 190 and at least one touch screen controller 195. The mobile terminal 100 further includes a controller 110, the mobile communication module 120, the sub-communication module 130, a multimedia module 140, a camera module 150, a Global Positioning System (GPS) module 157, an Input/Output (I/O) module 160, a sensor module 170, a memory 175, and a power supply 180.

The sub-communication module 130 includes at least one of a Wireless Local Area Network (WLAN) module 131 and a short-range communication module 132, and the multimedia module 140 includes at least one of a broadcasting communication module 141, an audio play module 142, and a video play module 143. The camera module 150 includes at least one of a first camera 151 and a second camera 152. In the mobile terminal 100 of the present invention, the camera module 150 includes at least one of a barrel 155 for zooming in or zooming out the first camera 151 and/or the second camera 152, a motor 154 for controlling movement of the barrel 155 for zoom-in or zoom-out, and a flash 153 for providing a light source to capture an image, according to a main usage of the mobile terminal 100. The I/O module 160 includes at least one of buttons 161, a microphone 162, a speaker 163, a vibration motor 164, the connector 165, and a keypad 166.

The controller 110 includes a Central Processing Unit (CPU) 111, a Read Only Memory (ROM) 112 for storing a control program to control the mobile terminal 100, and a Random Access Memory (RAM) 113 for storing signals or data received from the outside of the mobile terminal 100 or for use as a memory space for an operation performed by the mobile terminal 100. The CPU 111 includes one or more cores. The CPU 111, the ROM 112, and the RAM 113 may be interconnected through an internal bus.

The controller 110 controls the mobile communication module 120, the sub-communication module 130, the multimedia module 140, the camera module 150, the GPS module 157, the I/O module 160, the sensor module 170, the memory 175, the power supply 180, the touch screen 190, and the touch screen controller 195.

With a plurality of objects displayed on the touch screen 190, the controller 110 determines whether a touch input unit 168 such as an electronic pen has approached an object and has hovered over the object and identifies the object corresponding to the position of the hovering. The controller 110 determines the height of the input unit 168 above the mobile terminal 100 and senses a hovering input event according to the height. The hovering input event includes at least one of pressing of a button formed in the input unit 168, a tap of the input unit 168, faster movement of the input unit 168 than a predetermined speed, and a touch on an object. Upon generation of a hovering input event, the controller 110 displays a predetermined hovering input effect corresponding to the hovering input event on the touch screen 190.

The controller 110 determines whether a current place of the mobile terminal 100 is a major place by collecting at least one of state information and user information about the mobile terminal 100 sensed through the sensor module 170 and determines whether the current place has been registered based on at least one signal received from the surroundings. The major place refers to a place that the user has visited, and to which the user has carried the mobile terminal 100 at least a predetermined number of times, and thus has been registered or stored. The controller 110 may collect information sensed by at least one sensor of the mobile terminal 100 and mobile state information about the mobile terminal 100. In addition, the controller 110 may collect information about the user of the mobile terminal 100.

The controller 110 converts each piece of the collected information to a discrete value, generates a decision tree using the information, or analyzes the information statistically, according to the characteristics of the collected information. For example, the controller 110 determines the mobile state of the mobile terminal 100 by converting information sensed by at least one sensor (for example, time, a date, an illuminance, and proximity) to a discrete value and generating a decision tree based on information about the state of the mobile terminal 100 (for example, an acceleration, a magnetic field, a direction, and location information). The controller 110 determines what situation the user is or will be placed by statistically analyzing user information such as a schedule, a text message, a call record, a diary, and schedule management. The controller 110 generates a decision tree based on at least one piece of collected information.

The controller 110 controls output of a decision result on the touch screen 190 or through the speaker 163. The information about the current place refers to information that the user wrote and entered when the user previously visited the current place, and includes at least one of the name of the place, a building name, and location information. If the current place has not been registered, the controller 110 may prompt the user to enter information about the current place through at least one of the touch screen 190 and the microphone 162. The state information about the mobile terminal 100 includes mobile state information about the mobile terminal 100 and information sensed by at least one sensor of the mobile terminal 100. The user information refers to personal information such as a user's preferences, hobby, interest, and schedule and includes at least one of a schedule, a text message, and a call record.

The controller 110 calculates a probability of the current place being a major place using at least one of the state information about the mobile terminal 100 sensed by the sensor module 170 and the user information. The controller 110 calculates a probability corresponding to the mobile state of the mobile terminal 100 and the visit of a major place using at least one of the state information about the mobile terminal 100 and the user information by at least one of a machine learning scheme and a rule-based decision scheme.

The controller 110 calculates a probability corresponding to the mobile state of the mobile terminal 100 and the visit of a major place using at least one of the state information about the mobile terminal 100 and the user information by at least one of a decision tree, a Hidden Markov Model (HMM), and a neural networks model.

The controller 110 determines whether the current place is a major place by comparing the calculated probability with a threshold, which is set to determine whether the current place has been stored as a major place. If the probability is equal to or greater than the threshold, the controller 110 determines that the current place is a major place and if the probability is less than the threshold, the controller 110 does not determine that the current place is a major place. Upon receipt of at least one signal from a communication device that transmits a signal at the current location, the controller 110 analyzes an ID of the signal-transmitting device included in the received signal and the strength of the received signal. The signal includes at least one of a GPS signal, a signal from a WiFi AP, a Wireless broadband (Wibro) signal, a Bluetooth signal, an RFID tag signal, and a signal from an AP. The signal includes the signal strength and the ID of the signal-transmitting device. The controller 110 determines whether the current place has been registered by comparing the ID (first ID) of the signal-transmitting device included in the signal with an ID (second ID) of a device that transmitted a signal in a registered place. If the first ID is identical to the second ID, the controller 110 determines that the current place has been registered. That is, the second ID is included in a signal that was received when the user previously visited the current place. The controller 110 generates a decision tree for the current place using at least one of the state information about the mobile terminal 100 sensed by the sensor module 170 and the user information and stores the decision tree in the memory 175.

The mobile communication module 120 connects the mobile terminal 100 to an external device through one or more antennas (not shown) by mobile communication under the control of the controller 110. The mobile communication module 120 transmits wireless signals to or receives wireless signals from a portable phone (not shown), a smart phone (not shown), a tablet PC (not shown), or another electronic device (not shown) that has a phone number input to the mobile terminal 100, for a voice call, a video call, a Short Message Service (SMS), or a Multimedia Messaging Service (MMS).

The sub-communication module 130 includes at least one of the WLAN module 131 and the short-range communication module 132. For example, the sub-communication module 130 includes either or both of the WLAN module 131 and the short-range communication module 132. The sub-communication module 130 transmits and receives control signals to and from the input unit 168. A control signal transmitted and received between the mobile terminal 100 and the input unit 168 includes at least one of a field for supplying power to the input unit 168, a field that senses a touch or hovering of the input unit 168 on or over the touch screen 190, an ID of the input unit 168, and a field indicating X and Y coordinates of the input unit 168. The input unit 168 transmits a feedback signal to the mobile terminal 100 in response to a control signal received from the mobile terminal 100.

The WLAN module 131 may be connected to the Internet under the control of the controller 110 in a place where a wireless AP (not shown) is installed. The WLAN module 131 supports the WLAN standard IEEE802.11x of the Institute of Electrical and Electronics Engineers (IEEE). The short-range communication module 132 may conduct short-range wireless communication between the mobile terminal 100 and an image-forming device (not shown) under the control of the controller 110. The short-range communication may conform to Bluetooth®, Infrared Data Association (IrDA), WiFi Direct, and Near Field Communication (NFC).

The controller 110 may communicate with a nearby communication device, a remote communication device, and the input unit 168 through at least one of the WLAN module 131 and the short-range communication module 132.

The mobile terminal 100 includes at least one of the mobile communication module 120, the WLAN module 131, and the short-range communication module 132 according to capabilities of the mobile terminal 100. For example, the mobile terminal 100 includes a combination of the mobile communication module 120, the WLAN module 131, and the short-range communication module 132 according to its capabilities. In the present invention, at least one or a combination of two or more of the mobile communication module 120, the WLAN module 131, and the short-range communication module 132 is referred to as a transceiver, which should not be construed as limiting the scope of the present invention.

The multimedia module 140 includes the broadcasting communication module 141, the audio play module 142, or the video play module 143. The broadcasting communication module 141 receives a broadcast signal (for example, a TV broadcast signal, a radio broadcast signal, a data broadcast signal) and additional broadcasting information (for example, an Electronic Program Guide (EPG) or an Electronic Service Guide (ESG)) from a broadcasting station through a broadcasting communication antenna (not shown) under the control of the controller 110. The audio play module 142 may open a stored or received digital audio file (for example, a file having such an extension as mp3, wma, ogg, or wav) under the control of the controller 110. The video play module 143 may open a stored or received digital video file (for example, a file having such an extension as mpeg, mpg, mp4, avi, mov, or mkv) under the control of the controller 110. The video play module 143 may also open a digital audio file.

The multimedia module 140 includes the audio play module 142 and the video play module 143 without the broadcasting communication module 141. Alternatively, the audio play module 142 or the video play module 143 of the multimedia module 140 may be incorporated into the controller 110.

The camera module 150 includes at least one of the first camera 151 and the second camera 152, for capturing a still image or a video under the control of the controller 110. The camera module 150 includes at least one of the barrel 155 for zooming in or zooming out the first camera 151 and/or the second camera 152, the motor 154 for controlling movement of the barrel 155 for zoom-in or zoom-out, and the flash 153 for providing an auxiliary light source to capture an image. The first camera 151 may be disposed on the front surface of the mobile terminal 100, while the second camera 152 may be disposed on the rear surface of the mobile terminal 100. Alternatively, the first camera 151 and the second camera 152 may be arranged neareach other (for example, the distance between the first camera 151 and the second camera 152 is between 1 cm and 8 cm) in order to capture a three-dimensional still image or video.

Each of the first and second cameras 151 and 152 includes a lens system and an image sensor. The first and second cameras 151 and 152 convert optical signals received through (or captured by) the lens systems to electrical image signals and output the electrical image signals to the controller 110. The user may capture a video or a still image using the first and second cameras 151 and 152.

The GPS module 157 receives radio waves from a plurality of GPS satellites (not shown) in Earth's orbit and determines a position of the mobile terminal 100 based on the Time of Arrivals (ToAs) of satellite signals from the GPS satellites to the mobile terminal 100.

The I/O module 160 includes at least one of the plurality of buttons 161, the microphone 162, the speaker 163, the vibration motor 164, the connector 165, the keypad 166, the earphone connector jack 167, the input unit 168, and an insertion/removal sensing switch 169, to which the I/O module 160 is not limited. A cursor control such as a mouse, a trackball, a joystick, or cursor directional keys may be provided for communication with the controller 110 and for control of cursor movement on the touch screen 190.

The buttons 161 may be formed on the front surface, a side surface, or the rear surface of a housing of the mobile terminal 100, and includes at least one of a power/lock button, a volume button, a menu button, a home button, a back button, and a search button.

The microphone 162 receives a voice or a sound and converts the received voice or sound to an electrical signal under the control of the controller 110. The microphone 162 receives a voice or a sound irrespective of activation or deactivation of the microphone 162 under the control of the controller 110.

The speaker 163 outputs sounds corresponding to various signals (for example, a wireless signal, a broadcast signal, a digital audio file, a digital video file, and a photo shot) received from the mobile communication module 120, the sub-communication module 130, the multimedia module 140, and the camera module 150 under the control of the controller 110. The speaker 163 may further output a sound corresponding to a control signal transmitted to the input unit 168 through the short-range communication module 132. The sound corresponding to the control signal includes a sound related to activation of a vibration device 520, a sound having a variable volume according to a vibration strength, and a sound related to deactivation of the vibration device 520. The speaker 163 outputs sounds corresponding to functions (for example, a button manipulation sound, or a ringback tone for a call) performed by the mobile terminal 100. One or more speakers 163 may be disposed at an appropriate position or positions of the housing of the mobile terminal 100.

The vibration motor 164 converts an electrical signal to a mechanical vibration under the control of the controller 110. For example, the vibration motor 164 operates when the mobile terminal 100 receives an incoming voice call from another device (not shown) in vibration mode. One or more vibration motors 164 may be mounted inside the housing of the mobile terminal 100. The vibration motor 164 may operate in response to a user's touch on the touch screen 190 and a continuous movement of the touch on the touch screen 190.

The connector 165 may be used as an interface for connecting the mobile terminal 100 to an external device (not shown) or a power source (not shown). The connector 165 transmits data stored in the memory 175 to the external device via a cable connected to the connector 165 or receives data from the external device via the cable, under the control of the controller 110.

The keypad 166 receives a key input from the user to control the mobile terminal 100. The keypad 166 includes a physical keypad (not shown) formed in the mobile terminal 100 or a virtual keypad (not shown) displayed on the touch screen 190. The physical keypad may not be provided according to the capabilities or configuration of the mobile terminal 100.

An earphone may be connected to the mobile terminal 100 by being inserted into the earphone connector jack 167. The input unit 168 may be inserted and stored inside the mobile terminal 100. When the input unit 168 is used, it may be extended or removed from the mobile terminal 100. An insertion/removal-sensing switch 169 is provided in an internal area of the mobile terminal 100 into which the input unit 168 is inserted, in order to operate in response to insertion and removal of the input unit 168. The insertion/removal-sensing switch 169 outputs signals corresponding to insertion and removal of the input unit 168 to the controller 110. The insertion/removal-sensing switch 169 may be configured so as to directly or indirectly contact the input unit 168, when the input unit 168 is inserted. Therefore, the insertion/removal-sensing switch 169 outputs, to the controller 110, a signal corresponding to insertion or removal of the input unit 168, depending on whether the insertion/removal-sensing switch 169 contacts the input unit 168 directly or indirectly.

The sensor module 170 includes at least one sensor for detecting a state of the mobile terminal 100. For example, the sensor module 170 includes a proximity sensor for detecting whether the user is close to the mobile terminal 100, an illumination sensor for detecting the amount of ambient light around the mobile terminal 100, a motion sensor for detecting a motion of the mobile terminal 100 (for example, rotation, acceleration, and vibration of the mobile terminal 100), a geomagnetic sensor for detecting a point of the compass using the earth's magnetic field, a gravity sensor for detecting the direction of gravity, and an altimeter for detecting an altitude by measuring the air pressure.

At least one sensor may detect a state of the mobile terminal 100, generate a signal corresponding to the detected state, and transmit the generated signal to the controller 110. In this manner, the sensor module 170 senses at least one of a speed, acceleration, directional GPS information, an illuminance, gravity, a motion, an ambient sound, a current time, a remaining battery amount, and a geomagnetic field in relation to the mobile terminal 100. In the present invention, various other information that the user requests or may request may be sensed and stored in the memory 175. A sensor may be added to or removed from the sensor module 170 according to the capabilities of the mobile terminal 100.

The memory 175 stores input/output signals or data in accordance with operations of the mobile communication module 120, the sub-communication module 130, the multimedia module 140, the camera module 150, the GPS module 157, the I/O module 160, the sensor module 170, and the touch screen 190 under the control of the controller 110. The memory 175 stores a control program for controlling the mobile terminal 100 or the controller 110, and applications.

The term "memory" includes the memory 175, the ROM 112 and the RAM 113 within the controller 110, or a memory card (not shown) (for example, a Secure Digital (SD) card or a memory stick) mounted to the mobile terminal 100. The memory includes a non-volatile memory, a volatile memory, a Hard Disk Drive (HDD), and a Solid State Drive (SSD).

The memory 175 stores applications having various functions such as navigation, video call, game, and time-based alarm applications, images used to provide Graphical User Interfaces (GUIs) related to the applications, user information, text, databases or data related to a method of processing a touch input, background images (for example, a menu screen, or a waiting screen) or operation programs required to operate the mobile terminal 100, and images captured by the camera module 150. The memory 175 is a machine-readable medium (for example, a computer-readable medium). The machine-readable medium, such as a storage medium, provides data to a machine so that the machine may perform a specific function. The memory 175 includes a non-volatile medium and a volatile medium. All these media should be of a type providing commands detectable by a physical device that reads commands to a machine.

The memory 175 stores at least one decision tree generated by the controller 110. A decision tree may be generated based on at least one piece of information collected at the current location of the mobile terminal 100. Different decision trees may be generated for different places.

The machine-readable medium includes, but is not limited to, at least one of a floppy disk, a flexible disk, a hard disk, a magnetic tape, a Compact Disk Read Only Memory (CD-ROM), an optical disk, a punch card, a paper tape, a RAM, a Programmable ROM (PROM), an Erasable PROM (EPROM), and a Flash-EPROM.

The power supply 180 supplies power to one or more batteries (not shown) mounted in the housing of the mobile terminal 100 under the control of the controller 110. The one or more batteries supply power to the mobile terminal 100.

The mobile terminal 100 includes at least one touch screen 190 for providing User Interfaces (UIs) corresponding to various services (for example, call, data transmission, broadcasting, and photo taking) to the user. Each of the at least one touch screen 190 transmits an analog signal corresponding to at least one touch on a UI to a touch screen controller 195 corresponding to the touch screen 190. The mobile terminal 100 may be provided with a plurality of touch screens 190 and touch screen controllers 195 may be provided to receive an analog signal corresponding to a touch from the respective touch screens 190. The touch screens 190 may be connected respectively to a plurality of housings by hinges or to one housing without a hinge connection. As described above, the mobile terminal 100 of the present invention includes at least one touch screen 190. For the convenience of description, the following description is given in the context of a single touch screen.

The touch screen 190 receives at least one touch input through a user's body part (for example, a finger) or a touch input tool (for example, a stylus pen or an electronic pen). The touch screen 190 includes a pen recognition panel 191 that may recognize an input of a pen such as a stylus pen or an electronic pen. The pen recognition panel 191 determines the distance between the pen and the touch screen 190 by a magnetic field. The touch screen 190 receives a continuous movement of a single touch, among one or more touches. The touch screen 190 transmits an analog signal corresponding to a continuous movement of a touch to the touch screen controller 195.

In the present invention, the touch includes a non-contact touch (for example, a detectable gap between the touch screen 190 and the user's body part or the input unit 168 is about 5 mm), not limited to contacts between the touch screen 190 and the user's body part or the input unit 168. The gap detectable to the touch screen 190 may vary according to the capabilities or configuration of the mobile terminal 100. Particularly, to distinguish a touch event generated by contact between the touch screen 190 and a user's body or the input unit 168 from a non-contact input event (for example, a hovering event), the touch screen 190 outputs different detection values (for example, different analog voltage or current values) for the touch event and the hovering event. The touch screen 190 outputs a different detection value (for example, a different current value) according to the distance between an area of a hovering event and the touch screen 190.

The touch screen 190 may be implemented as, for example, a resistive type, a capacitive type, an infrared type, or an acoustic wave type.

To receive an input of the user's body and an input of the input unit 168 simultaneously or sequentially, the touch screen 190 includes at least two touch screen panels that sense touches or proximity of the user's body and the input unit 168, respectively. The at least two touch screen panels provide different output values to the touch screen controller 195, and the touch screen controller 195 determines whether an input from the touch screen 190 is an input of the user's body or an input of the input unit 168 by distinguishing values received from the at least two touch screen panels. The touch screen 190 displays at least one object.

More specifically, the touch screen 190 may be configured by stacking a panel to sense an input of a finger or the input unit 168 by a change in inducted power and a panel to sense contact of a finger or the input unit 168 on the touch screen 190, in close contact with or farther apart from each other. This touch screen 190 includes a large number of pixels to display an image. The touch screen 190 includes at least one of a Liquid Crystal Display (LCD) panel, an Organic Light Emitting Diode (OLED) display, or an LED display.

The touch screen 190 includes a plurality of sensors to sense the position of a finger or the input unit 168 that touches the touch screen 190 or is spaced from the touch screen 190 by a predetermined distance. Each of the sensors may have a coil structure. In a sensor layer formed by the plurality of sensors, each sensor has a predetermined pattern and a plurality of electrode lines are formed. Thus, when a finger or the input unit 168 touches or hovers above the touch screen 190, a sensing signal having a changed waveform is generated due to the capacitance between the sensor layer and the input means. The touch screen 190 transmits the sensing signal to the controller 110. The distance between the input unit 168 and the touch screen 190 may be determined based on the strength of a magnetic field formed by a coil 510 of the input unit 168.

The touch screen controller 195 converts an analog signal received from the touch screen 190 to a digital signal (X and Y coordinates) and transmits the digital signal to the controller 110. The controller 110 controls the touch screen 190 using the received digital signal. For example, the controller 110 may select or execute a shortcut icon (not shown) or an object displayed on the touch screen 190 in response to a touch event or a hovering event. The touch screen controller 195 may be incorporated into the controller 110.

The touch screen controller 195 determines the distance between a hovering input area and the touch screen 190 by detecting a value (for example, a current value) output from the touch screen 190, converts the distance to a digital signal (for example, a Z coordinate), and provides the digital signal to the controller 110.

Figure 2:
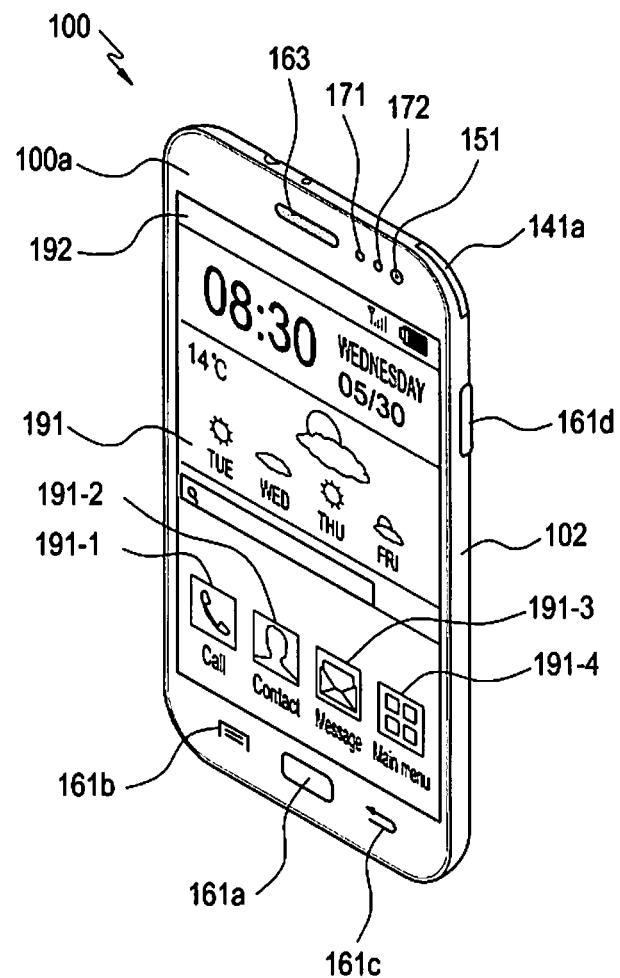
FIG. 2 is a front perspective view of a mobile terminal according to an embodiment of the present invention.
Figure 3:
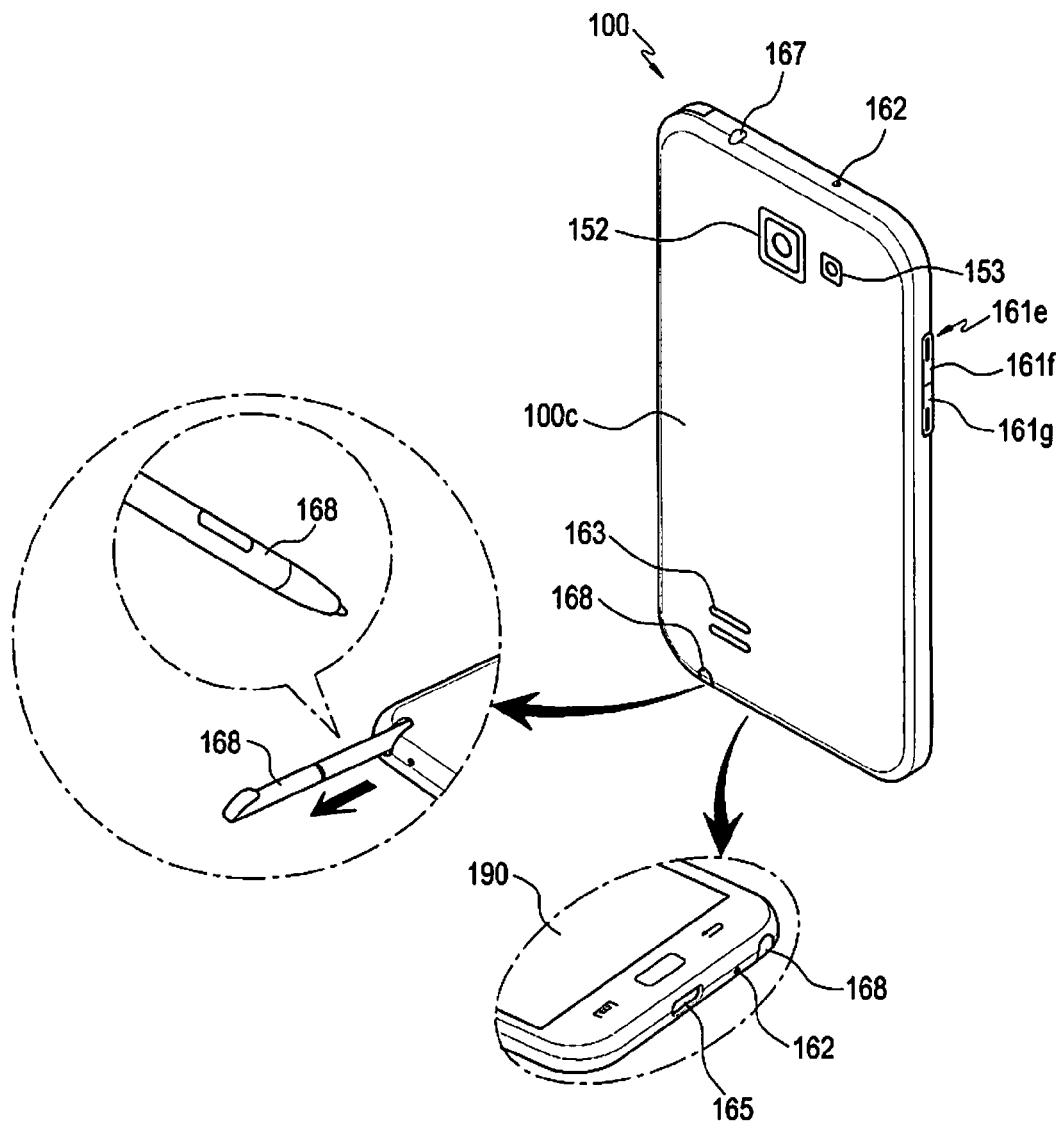
FIG. 3 is a rear perspective view of a mobile terminal according to an embodiment of the present invention.

FIGS. 2 and 3 are front and rear perspective views of a mobile terminal respectively according to an embodiment of the present invention.

Referring to FIGS. 2 and 3, the touch screen 190 is disposed at the center of the front surface 100*a* of the mobile terminal 100, occupying almost the entire the front surface 100*a*. In FIG. 2, a main home screen is displayed on the touch screen 190, by way of example. The main home screen is the first screen to be displayed on the touch screen 190, when the mobile terminal 100 is powered on. When the mobile terminal 100 has different home screens of a plurality of pages, the main home screen may be the first of the home screens of the plurality of pages. Shortcut icons 191-1, 191-2 and 191-3 for executing frequently used applications, a main menu switch key 191-4, time, and weather are displayed on the home screen. A status bar 192 is displayed at the top of the touch screen 190 in order to indicate states of the mobile terminal 100 such as a battery charged state, a received signal strength, and a current time.

A home button 161*a*, a menu button 161*b*, and a back button 161*c* are formed at the bottom of the touch screen 190.

The home button 161*a* is used to display the main home screen on the touch screen 190. For example, upon touching of the home button 161*a* while any home screen other than the main home screen or a menu screen is displayed on the touch screen 190, the main home screen is displayed on the touch screen 190. Upon touching of the home button 161*a* during execution of applications on the home screen 190, the main home screen illustrated in FIG. 2 is displayed on the touch screen 190. The home button 161*a* may also be used to display recently used applications or a task manager on the touch screen 190.

The menu button 161*b* provides link menus available on the touch screen 190. The link menus include a widget adding menu, a background changing menu, a search menu, an edit menu, and an environment setting menu.

The back button 161*c* displays a screen previous to a current screen or end the latest used application.

The first camera 151, an illumination sensor 170*a*, and a proximity sensor 170*b* may be arranged at a corner of the front surface 100*a* of the mobile terminal 100, whereas the second camera 152, the flash 153, and the speaker 163 may be arranged on the rear surface 100*c* of the mobile terminal 100.

For example, a power/reset button 161*d*, a volume button 161*e*, including a volume up button 161*f* and a volume down button 161*g*, a terrestrial DMB antenna 141*a* for receiving a broadcast signal, and one or more microphones 162 may be disposed on side surfaces 100*b* of the mobile terminal 100. The DMB antenna 141*a* may be fixedly or detachably mounted to the mobile terminal 100.

The connector 165 is formed on the bottom side surface of the mobile terminal 100. The connector 165 includes a plurality of electrodes and may be connected to an external device by wire. The earphone connector jack 167 may be formed on the top-side surface of the mobile terminal 100, for allowing an earphone to be inserted.

The input unit 168 may be provided into the bottom side surface of the mobile terminal 100. The input unit 168 may be inserted and stored inside the mobile terminal 100. When the input unit 168 is used, the input unit 168 may be extended and detached from the mobile terminal 100.

Figure 4:
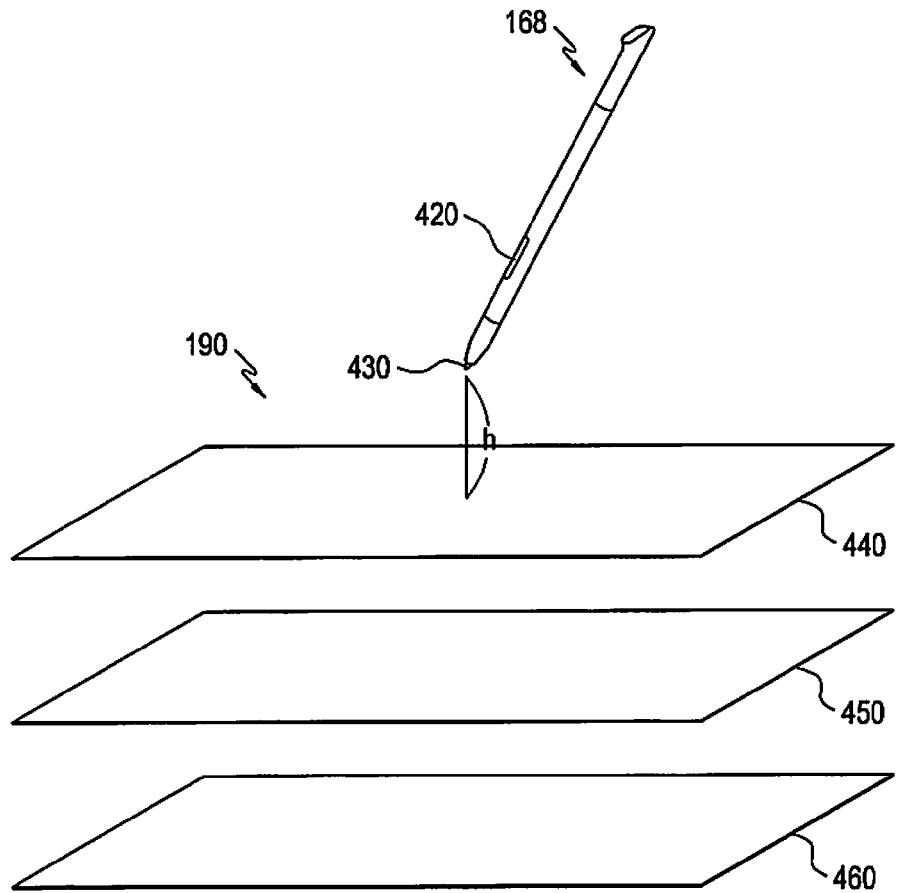
FIG. 4 illustrates an input unit and an interior section of a touch screen according to an embodiment of the present invention.

FIG. 4 illustrates an input unit for providing a vibration effect and an interior section of a touch screen according to an embodiment of the present invention.

Referring to FIG. 4, the touch screen 190 includes a display panel 450, a first touch panel 440, and a second touch panel 460. The display panel 450 may be an LCD panel or an Active Matrix Organic Light Emitting Diode (AMOLED) panel, which displays various images according to, for example, the operation states of the mobile terminal 100, application execution, and services.

The first touch panel 440 is a capacitive touch panel formed by coating a thin metal material (for example, Indium Tin Oxide (ITO)) as a dielectric material on both surfaces of glass so that current may flow on the glass surfaces. When an input device (for example, a user's finger or a pen) touches a surface of the first touch panel 440, a certain amount of charge migrates to the touched position due to static electricity and the first touch panel 440 detects the touched position by sensing a variation in current caused by the charge migration. The first touch panel 440 is capable of sensing all touches that generate static electricity and sensing all touches made by the input device, that is, a finger or pen.

The second touch panel 460 is an ElectroMagnetic Resonance (EMR) touch panel including an electromagnetic induction coil sensor (not shown) having a grid structure in which a plurality of loop coils are arranged in predetermined first and second directions which are perpendicular to each other, and an electromagnetic signal processor for providing an alternating signal having a predetermined frequency sequentially to the loop coils of the electromagnetic induction coil sensor.

When the input unit 168 having a built-in resonant circuit is positioned in the vicinity of a loop coil of the second touch panel 460, a magnetic field output from the loop coil generates current based on mutual electromagnetic induction in the resonant circuit of the input unit 168. An induction field is then generated from a coil (not shown) of the resonant circuit in the input unit 168 and the second touch panel 460 detects the induction field in loop coils placed in a reception state. Therefore, the second touch panel 460 senses the hovering position and touched position of the input unit 168 and the height h of a pen tip 430 of the input unit 168 above the mobile terminal 100. The height h may vary according to the capabilities or a configuration of the mobile terminal 100. The second touch panel 460 senses the hovering and touch of any input means that can generate current based on electromagnetic induction.

In accordance with an embodiment of the present invention, it is assumed that the second touch panel 460 is dedicated to sensing the hovering or touch of the input unit 168. The input unit 168 may be referred to as an electromagnetic pen or an EMR pen. The input unit 168 may have a different configuration from a general pen that does not include a resonant circuit, sensed by the first touch panel 440. The input unit 168 includes a button 420 for changing an electromagnetic induction value generated by the coil inside a pen body in the vicinity of the pen tip 430. The input unit 168 will be described later in detail with reference to FIG. 5.

The operation mode of at least one of the first and second touch panels 440 and 460 is changed under the control of the controller 110. That is, at least one of the first and second touch panels 440 and 460 is switched to a mode corresponding to at least one parameter measured at a position of the input unit 168 under the control of the controller 110. At least one of the first and second touch panels 440 and 460 is switched to a passive mode or a digital mode according to a voltage at a position of the input unit 168 and a distance to the input unit 168. In the passive mode, although the input unit 168 is detected, at least one of mode switching and mode control of the touch screen 190 does not occur by the detected input unit 168. In the digital mode, at least one of communication with the detected input unit 168 and power supply is performed. The digital mode is divided into a plurality of modes depending on whether data communication is conducted with the input unit 168 and a touch of the input unit 168 can be measured. The plurality of modes include a mode of sensing none of hovering and touch of the input unit 168, a mode of sensing hovering of the input unit 168, and a mode of sensing touch of the input unit 168. In these modes, the mobile terminal 100 transmits and receives a control signal to and from the input unit 168. The digital mode is also divided into an active digital mode in which the input unit 168 includes a battery and a passive digital mode in which the input unit 168 does not include a battery. If the detected input unit 168 is a passive input unit that does not receive power from the mobile terminal 100, at least one of the first and second touch panels 440 and 460 operates in the passive mode.

The touch screen controller 195 includes a first touch panel controller (not shown) and a second touch panel controller (not shown). The first touch panel controller converts an analog signal corresponding to a sensed finger touch or pen touch, received from the first touch panel 440 to a digital signal (for example, X, Y and Z coordinates) and provides the digital signal to the controller 110. The second touch panel controller converts an analog signal corresponding to the sensed hovering or touch of the input unit 168 from the second touch panel 460 to a digital signal and provides the digital signal to the controller 110. The controller 110 controls the display panel 450, the first touch panel 440, and the second touch panel 460 using the digital signals received from the first and second touch panel controllers. For example, the controller 110 may display a predetermined screen on the display panel 450 in response to the finger touch or pen touch or in response to the hovering or touch of the input unit 168.

In accordance with an embodiment of the present invention, therefore, the first touch panel 440 senses a user's finger touch or pen touch and the second touch panel 460 senses the hovering or touch of the input unit 168 in the mobile terminal 100. The controller 110 may distinguish the finger touch or pen touch from the hovering or touch of the input unit 168. While only one touch screen is shown in FIG. 4, the present invention is not limited to a single touch screen and may have a plurality of touch screens. Each touch screen may be engaged with one housing by a hinge or a plurality of touch screens may be mounted in a single housing in the mobile terminal 100. As illustrated in FIG. 4, each touch screen includes a display panel and at least one touch panel.

Figure 5:
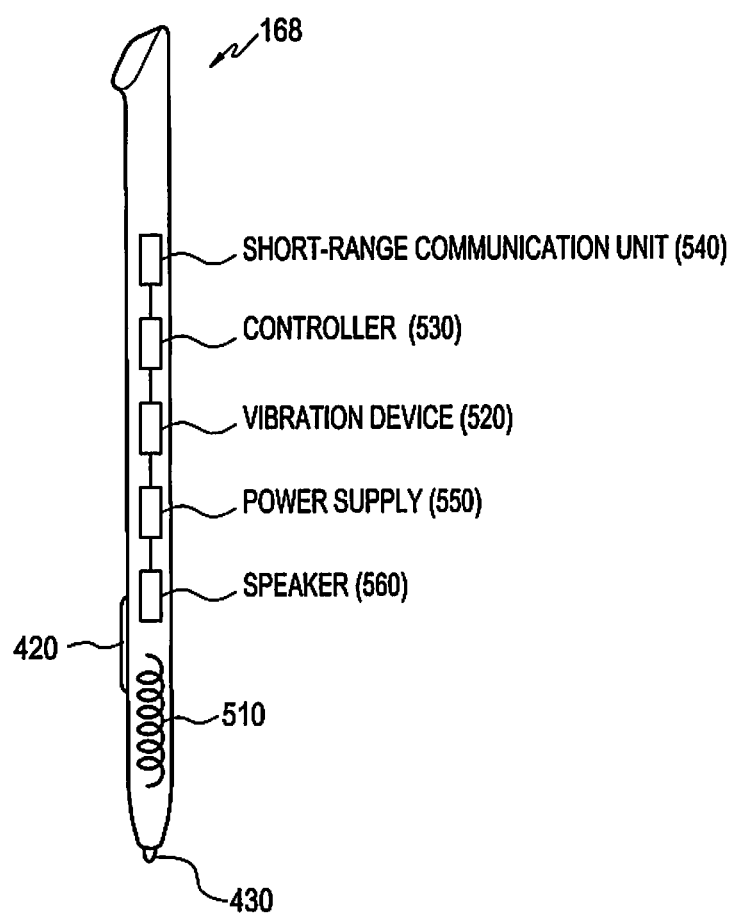
FIG. 5 illustrates an input unit according to an embodiment of the present invention.

FIG. 5 illustrates an input unit according to an embodiment of the present invention. Referring to FIG. 5, the input unit 168 (for example, a touch pen) includes a pen body, the pen tip 430 formed at the tip of the pen body, the button 420 for changing an electromagnetic induction value generated by the coil 510 disposed near the pen tip 430 within the pen body, the vibration device 520 that vibrates to provide a haptic effect, a controller 530 that analyzes a control signal received from mobile terminal 100 upon generation of a hovering input and controls the vibration strength and period of the vibration device 520 to provide a haptic effect to the input unit 168, a short-range communication unit 540 that conducts short-range communication with the mobile terminal 100, and a power supply 550 that supplies power for vibration of the input unit 168. The input unit 168 includes a speaker 560 that outputs a sound corresponding to a vibration period and/or vibration strength of the input unit 168. The speaker 560 outputs a sound corresponding to a haptic effect provided to the input unit 168 simultaneously with sound output of the speaker 163 of the user device 100 or a predetermined time (for example, 10 ms) before or after sound output of the speaker 163 of the mobile terminal 100.

The input unit 168 having the above-described structure may operate by EMR. Upon generation of a magnetic field at a specific position of the touch screen 190 by the coil 510, the touch screen 190 determines a touched position by detecting the position of the magnetic field.

More specifically, the speaker 560 outputs sounds corresponding to various signals (for example, a wireless signal, a broadcast signal, a digital audio file, and a digital video file) received from the mobile communication module 120, the sub-communication module 130, or the multimedia module 140 of the mobile terminal 100 under the control of the controller 530. The speaker 560 outputs a sound corresponding to a function executed in the mobile terminal 100 (e.g. a button manipulation sound or a ringback tone in a call). One or more speakers 560 may be provided at an appropriate position(s) of a housing of the input unit 168.

If the pen tip 430 touches the touch screen 190 or is positioned at a hovering-sensed height (for example, 5 mm) above the touch screen 190, the controller 530 analyzes at least one control signal received from the mobile terminal 100 through the short-range communication unit 540 and control the vibration period and vibration strength of the vibration device 520 in the input unit 168 according to the analyzed control signal.

Figure 6:
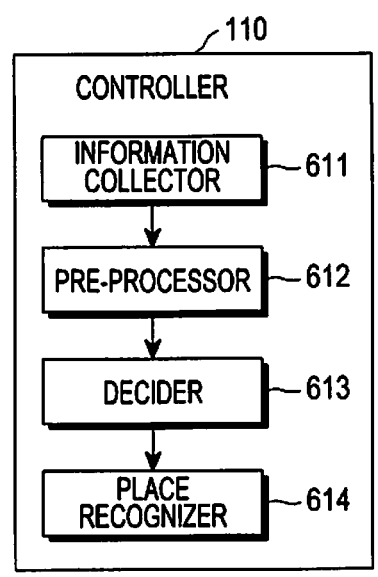
FIG. 6 illustrates a controller for controlling place recognition in a mobile terminal according to an embodiment of the present invention.

FIG. 6 illustrates a controller for controlling place recognition in a mobile terminal according to an embodiment of the present invention.

Referring to FIG. 6, the controller 110 includes an information collector 611 for collecting information from the sensor module 170 and the memory 175, a pre-processor 612 for pre-processing the collected information into state information about the mobile terminal 100 and user information, a decider 613 for determining whether a current place in which the mobile terminal 100 is placed is a major place based on the state information and the user information, and a place recognizer 614 for determining, if the current place is determined to be a major place, whether the current place has already been registered using at least one signal received from the surroundings.

With reference to FIG. 6, the controller 110 for controlling place recognition in the mobile terminal 100 according to the embodiment of the present invention will be described below.

The information collector 611 may collect at least one of state information about the mobile terminal 100 and user information. The state information about the mobile terminal 100 includes information about the mobile state of the mobile terminal 100 and information generated by at least one sensor of the mobile terminal 100. The mobile state information about the mobile terminal 100 includes information about at least one of a speed, a direction, acceleration, and the location of a current place (for example, GPS information) in relation to the mobile terminal 100.

The information generated by at least one sensor of the mobile terminal 100 includes information about at least one of an illuminance, gravity, a motion, am ambient sound, a wind force, a current time, a geomagnetic field, and a remaining battery amount. The user information is personal information about a user, including at least one of a schedule, a text message, a call record, a diary, and schedule management. The state information and the user information about the mobile terminal 100 may be collected periodically as illustrated in Table 1 or aperiodically, for example. In the present invention, the information may be collected with periodicities illustrated in Table 1, as follows, or in periods set by the user. The information collector 611 senses proximity, an acceleration, a direction, and a location which are measured while the user carrying the mobile terminal 100 is stationary, walking, running, or moving in a vehicle.

TABLE 1

| Collected information | Collection period | Information |
|---|---|---|
| Location information (for example, GPS information) | Once per second | Current date, time, latitude, and longitude |
| Call record | Once per day | Starting time of call, end time of call, called identification, call state(incoming/outgoing/missing) |
| Text message | Once per day | Incoming/outgoing time of text message, incoming/outgoing, sender and recipient identification |
| Proximity | Five times per second | Current contact state (1 or 0) |
| Acceleration | Five times per second | 3-axis acceleration value (−2 g~2 g) |
| Direction | Five times per second | Current 3-axis inclination of mobile terminal |
| Geomagnetic field | Five times per second | 3-axis magnetic field value (uT) |
| Time | Once per five seconds | Current time |
| Schedule information | Once per hour | Schedule in specific time zone |
| Remaining battery amount | Once per five seconds | Current remaining battery level (%) |

In Table 1, location information may be collected once per second, including information about a current date, time, latitude, and longitude. A call record may be collected once per day, including information about the starting and ending times of calls, called parties, and call states. Text messages may be collected once per day, including information about incoming/outgoing times of text messages, incoming/outgoing of text messages, and identified senders and recipients. Proximity represents a current contact state, collected five times per second. If the mobile terminal 100 is currently in a contact state, the proximity is set to '1' and otherwise, it is set to '0'. Geomagnetic field information is collected five times per second and determined based on a 3-axis magnetic field value. Schedule information is collected once per hour, indicating a schedule in a specific time zone. Remaining battery amount information is collected once per five seconds, representing a current remaining battery level. The periods in which the above information is collected may be changed.

The pre-processor 612 pre-processes the information sensed by the information collector 611 into state information about the user. The pre-processor 612 calculates a probability corresponding to the mobile state of the mobile terminal 100 and the visit of a major place using at least one piece of the collected information by a machine learning scheme such as a decision tree, an HMM, or a neural networks model. The pre-processor 612 determines whether the user carrying the mobile terminal 100 is stationary, walking, running, or moving in a vehicle based on the calculated probability. The pre-processor 612 may further determine information such as an ambient brightness, a current time, and a user's schedule based on the calculated probability.

The decider 613 determines whether the user is visiting a major place by integrating the information calculated by the pre-processor 612. If the probability calculated based on at least one piece of the current collected information is equal to or greater than a predetermined threshold that guarantees the visit of a major place, the decider 613 transmits '1' to the place recognizer 614. If the probability is less than the threshold, the decider 613 transmits '0' to the place recognizer 614.

The place recognizer 614 analyzes the value received from the decider 613 and scans for at least one signal-transmitting device at the current location. The signal-transmitting device includes at least one of a WiFi AP, a Wibro device, a Bluetooth® device, an RFID tag, and an AP. In the present invention, besides the WiFi AP, the signal-transmitting device may further include various devices that transmit signals sensible to the mobile terminal 100. The place recognizer 614 determines whether the current place has already been registered by the strength of a signal included in at least one received signal and the ID of a device that transmits the signal. The place recognizer 614 searches for a registered major device in a pre-registered place database using the signal strength and the ID of the signal-transmitting device and outputs a search result through at least one of the touch screen 190 and the speaker 163.

Figure 7:
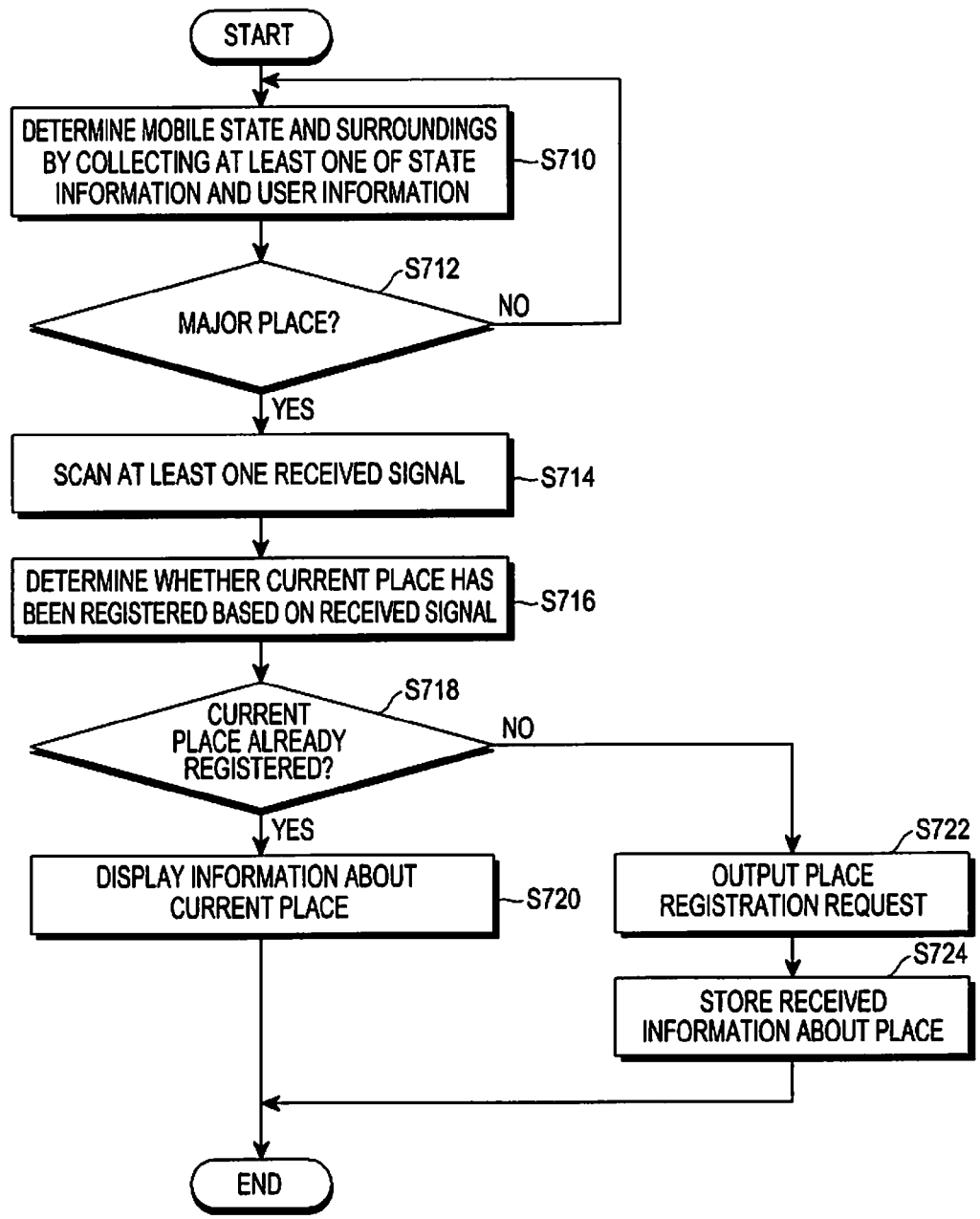
FIG. 7 illustrates an operation for controlling place location in a mobile terminal according to an embodiment of the present invention.

FIG. 7 illustrates an operation for controlling place location in a mobile terminal according to an embodiment of the present invention.

Referring to FIG. 7, at least one of state information and user information about the mobile terminal is collected and the mobile state and surroundings of the mobile terminal are determined based on the collected information in step S710. The mobile terminal 100 may collect at least one of the state information and user information about the mobile terminal 100 periodically or aperiodically. The state information about the mobile terminal includes mobile state information about the mobile terminal and information generated by at least one sensor of the mobile terminal. The mobile state information about the mobile terminal includes information about at least one of a speed, a direction, acceleration, and the location of a current place (for example, GPS information) in relation to the mobile terminal. The information generated by at least one sensor of the mobile terminal includes information about at least one of an illuminance, gravity, a motion, am ambient sound, a wind force, a current time, a geomagnetic field, and a remaining battery amount. The user information is personal information about a user, including at least one of a schedule, a text message, a call record, a diary, schedule management. The mobile terminal 100 determines, based on the user information, when and whom the user will meet, when and whom the user called or was called from, and when and with whom the user exchanged text messages, for example.

If, in step S712, it is determined that a current place that the user is visiting is a major place, at least one signal received from the surroundings is scanned and it is determined based on the received signal whether the current place has already been registered in steps S714 and S716. The mobile terminal 100 determines whether the current place is a major place based on the mobile state and surroundings of the mobile terminal 100 determined based on the collected information in step S710. The mobile terminal 100 calculates a probability corresponding to the mobile state of the mobile terminal 100 and the visit of a major place using at least one piece of the collected information by at least one of a decision tree, an HMM, and a neural networks model and determines whether the current place is a major place based on the probability. To determine whether the current place is a major place, the calculated probability may be compared with a predetermined threshold. A place that has been visited as many times as or more times than a predetermined threshold may be set as a major place.

When the current place is a major place, the mobile terminal 100 determines whether the current place has already been registered in step S718, using at least one signal received from the surroundings. That is, the mobile terminal 100 may scan at least one signal received from the surroundings and compare an ID (first ID) of a signal-transmitting device included in the received signal with an ID (second ID) of a device that transmitted a signal in a registered place. If the first ID is identical to the second ID, the controller 110 determines that the current place has been registered. The signal may be received through at least one of a WiFi AP, Wibro, Bluetooth, and an RFID tag and includes the ID of the signal-transmitting device that transmits the signal.

If the current place has already been registered in operation S718, information about the current place is displayed in step S720. That is, the mobile terminal 100 outputs information about the current place through at least one of the touch screen 190 and the microphone 162. The information about the current place is information that the user inputted when the user previously visited the place, including at least one of a place name, a building name, and location information. The information about the current place may also include at least one of a service available to the user at the current place and the distance to an adjacent registered place. That is, the information about the current place includes various types of information that can be input by user selection, such as a user's preferences, a hobby, the number of visits, a service available from the surroundings.

If the current place has not been registered, a message requesting place registration is output in step S722 and information about the place input in response to the request is stored in step S724. If the current place has not been registered, a request input of information about the current place may be output through at least one of the touch screen 190 and the speaker 163. Information input in response to the request is information that the user wants to obtain when the user visits at a later time, including at least one of a place name, a building name, and location information. The information about the current place may also include at least one of a service available to the user at the current place and the distance to an adjacent registered place. That is, the information about the current place includes various types of information that can be input by user selection, such as a user's preferences, a hobby, the number of visits, a service available from the surroundings. The information input in response to the request is stored in the memory 175. In addition, the input information may be transmitted to a server and stored in the server.

Figure 8:
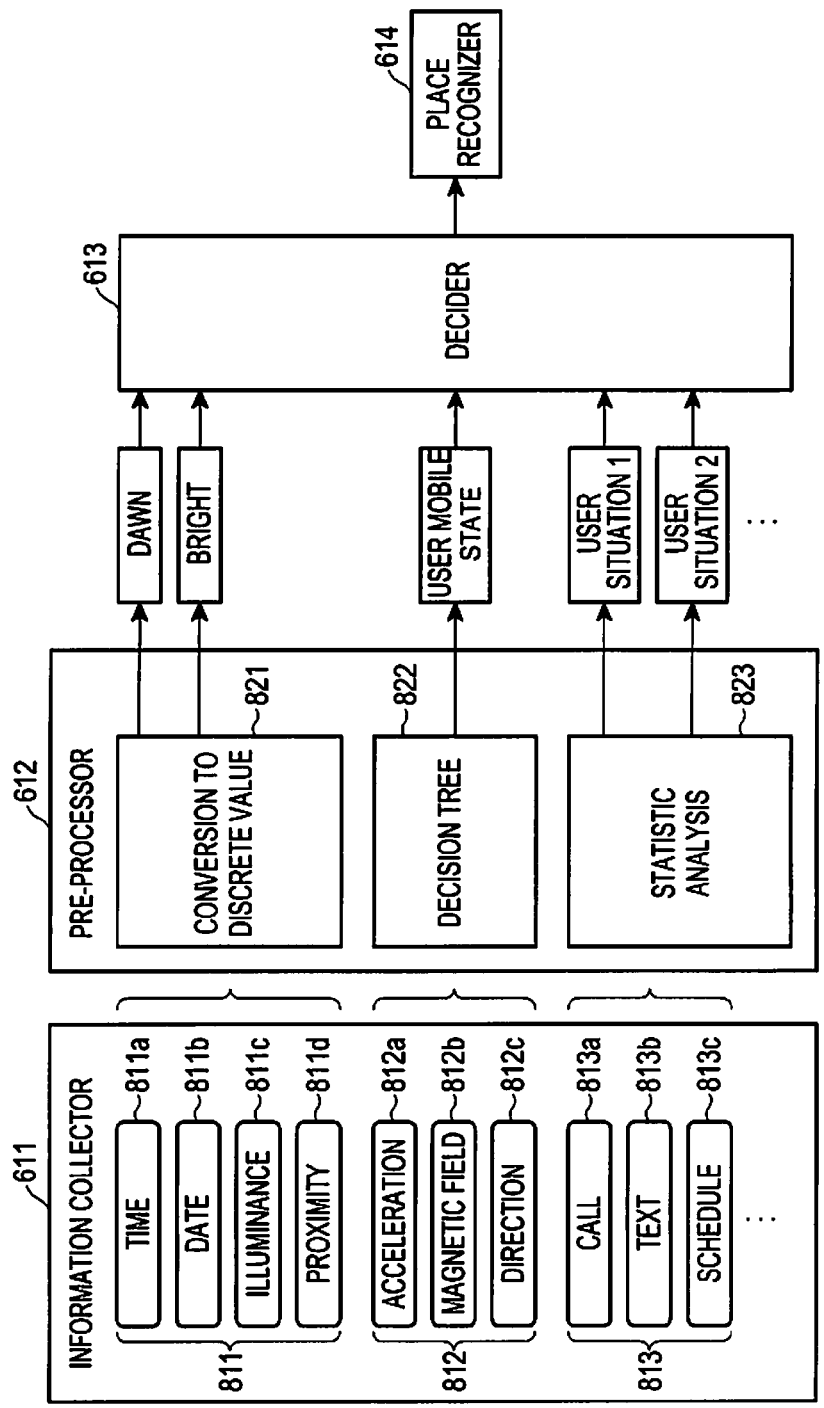
FIG. 8 illustrates connections between blocks for controlling place recognition in a mobile terminal according to an embodiment of the present invention.

FIG. 8 illustrates connections between blocks for controlling place recognition in a mobile terminal according to an embodiment of the present invention.

Referring to FIG. 8, the information collector 611 collects information from at least one of the sensor module 170 and the memory 175. The information collector 611 may collect at least one of state information about the mobile terminal 100 and user information 813. The state information about the mobile terminal 100 includes mobile state information 812 representing the mobile state of the mobile terminal 100 and information 811 generated by at least one sensor of the mobile terminal 100. The mobile state information 812 includes an acceleration 812*a*, a magnetic field 812*b*, and a direction 812*c*. The mobile state information 812 may further include at least one of a geomagnetic field and location information (for example, GPS information) about a current place. The information 811 generated by the at least one sensor includes a time 811*a*, a date 811*b*, an illuminance 811c, and a proximity 811d. The information 811 may further include at least one of gravity, a motion, an adjacent sound, a wind force, and a remaining battery amount. The user information 813 is personal information about a user, including a call 813a, a text message 813b, and a schedule 813c. The user information 813 may further include a call record, a diary, and schedule management.

The pre-processor 613 may pre-process the information sensed by the information collector 611. The pre-processor 612 may integrate the received information as user state information. The pre-processor 612 includes a module 821 for receiving the information 811 generated by the at least one sensor and converting the received information into a discrete value to thereby determine whether the ambient lighting is bright or reveals dawn, a module 822 for receiving the mobile state information 812 about the mobile terminal 100 and generating a decision tree, to thereby determine the user's mobile state, and a module 823 for receiving the user information including the call 813a, the text message 813b, and the schedule 813c and analyzing a current situation of the user statistically. The pre-processor 612 may perform the above-described operations independently in the respective modules 821, 822, and 823. Alternatively, the pre-processor 612 may receive the information 811 generated by the at least one sensor, determine whether the ambient lighting is bright or reveals dawn, for example, by converting the received information into discrete values, generate a decision tree based on the discrete values, and determine the user's situation by statistically analyzing the decision tree.

The pre-processor 612 calculates a probability corresponding to the mobile state of the mobile terminal 100 and the visit of a major place based on at least one piece of the collected information by various artificial intelligence schemes including a decision tree, an HMM, and a neural networks model. The pre-processor 612 determines whether the user carrying the mobile terminal 100 is stationary, walking, running, or moving in a vehicle based on the calculated probability. The pre-processor 612 may further determine information such as an ambient brightness, a current time, and a user's schedule based on the calculated probability.

The decider 613 determines comprehensively, statistically, or probabilistically whether the user is visiting a major place by integrating the information calculated by the pre-processor 612. If the probability calculated based on at least one piece of the current collected information is equal to or greater than a predetermined threshold that guarantees the visit of a major place, the decider 613 transmits true (for example, '1') to the place recognizer 614. If the probability is less than the threshold, the decider 613 transmits false (for example, '0') to the place recognizer 614.

Figure 9:
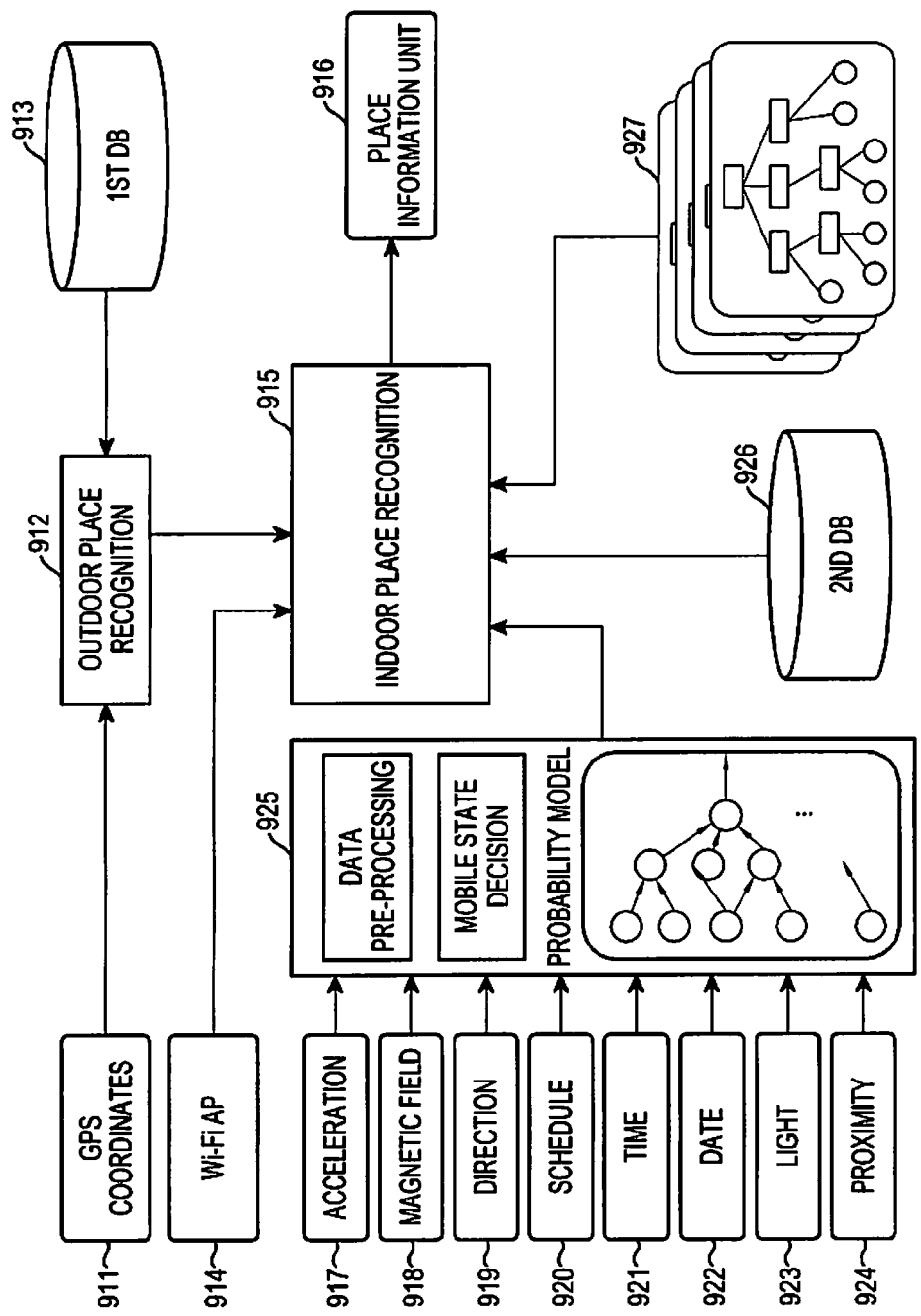
FIG. 9 illustrates connections between blocks for controlling place recognition in a mobile terminal according to another embodiment of the present invention.

FIG. 9 illustrates connections between blocks for controlling place recognition in a mobile terminal according to another embodiment of the present invention.

The mobile terminal 100 may recognize or determine a current place in which the mobile terminal 100 is located using state information about the mobile terminal 100, mobile state information about the mobile terminal 100, and information generated by at least one sensor of the mobile terminal 100.

In the present invention, the mobile terminal 100 controls place recognition irrespective of whether the mobile terminal 100 is located indoors or outdoors. If the mobile terminal 100 is located outdoors, the mobile terminal 100 receives GPS coordinates 911 and determines that the mobile terminal is located in an outdoor place based on the received GPS coordinates 911. Upon receipt of the GPS coordinates 911, the mobile terminal 100 determines the current place by accessing a first DataBase (DB) 913. The first DB 913 may be a server that stores the GPS coordinates of each place. If the mobile terminal 100 is located indoors, the mobile terminal 100 determines that it is located in an indoor place as indicated by reference numeral 915 by receiving a signal from a WiFi AP 914.

The mobile terminal 100 transmits information about the current place to a place information unit 916 so that the information about the current place may be managed and stored in the place information unit 916. The signal includes at least one of a Service Set Identifier (SSID), a Medium Access Control (MAC) address, and a Receive Signal Strength Indication (RSSI). According to the present invention, the mobile terminal 100 determines an indoor place based on the GPS coordinates 911 and an outdoor place based on the signal received from the WiFi AP 914. In the present invention, the mobile terminal 100 may recognize the current place by pre-processing at least one of an acceleration 917, a magnetic field 918, a direction 919, a user's schedule 920, a time 921, a date 922, light 923, and a proximity 924, by generating a decision tree, or by statistical analysis.

In addition, the mobile terminal 100 determines whether it is located indoors or outdoors based on at least one of the WiFi AP 914, the acceleration 917, the magnetic field 918, the direction 919, the user's schedule 920, the time 921, the date 922, the light 923, and the proximity 924. Upon sensing at least one of state information about the mobile terminal 100, mobile state information about the mobile terminal 100, and information generated by at least one sensor of the mobile terminal 100, the mobile terminal 100 may access a second DB 926 and determine the current place. The second DB 926 stores finger printing information about a signal-transmitting device in each place.

The mobile terminal 100 generates a decision tree for each place using at least one of the WiFi AP 914, the acceleration 917, the magnetic field 918, the direction 919, the user's schedule 920, the time 921, the date 922, the light 923, and the proximity 924. At least one decision tree 927 generated on a place basis may be stored in the memory of the mobile terminal 100. The decision tree 927 may be stored in the mobile terminal 100 or in a server. In the decision tree 927, a major place may be positioned on the top of the decision tree, and a minor place less important than the major place may be positioned lower than the position of the major place. In the decision tree 927, each place may be linked in a higher layer or a lower layer according to the number of visits to the place or whether the place is registered as a major place by the user.

The disclosed mobile terminal and method for controlling place recognition may be implemented as computer-readable code in a computer-readable recording medium. The computer-readable recording medium includes any kind of recording device storing computer-readable data. Examples of the recording medium includes Read Only Memory (ROM), Random Access Memory (RAM), optical disk, magnetic tape, floppy disk, hard disk, and non-volatile memory. In addition, the computer-readable recording medium may be distributed over the computer systems connected over the network, and computer-readable codes may be stored and executed in a distributed manner.

As is apparent from the foregoing description, it is determined whether a user is visiting a major place based on at least one of state information about a mobile terminal and user information. At least one signal may be received from a signal-transmitting device such as an AP and GPS information about the current place may be automatically collected and learned. Thus, when the user re-visits the place, the place is automatically recognized, thereby relieving the user of the constraint of labeling a visited place and shortening a place recognition time.

Since the present invention is applicable to a context-based application using place information along with time information as context information, a user can be prompted to write a personal place significant to the user using an easy place labeling system and thus build a personal place information DB. The present invention may be used in developing a location-based system for the user by building a place DB meaningful to the user. When a DB is built through participation of a number of users, the place DB can be shared among the users and thus a place name that is not written directly can be readily identified.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for controlling place recognition in a mobile terminal, the method comprising:
   collecting, by a processor of the mobile terminal, at least one of state information about the mobile terminal and user personal information stored in the mobile terminal;
   determining, by the processor, whether a current place of the mobile terminal is a major place that a user has previously visited at least a number of times, using the collected information;
   determining, by the processor, if it is determined that the current place of the mobile terminal is a major place, whether the current place has been registered using at least one signal received externally; and
   outputting, on a touch screen of the mobile terminal, if the current place has been registered, information about the current place,
   wherein the state information includes moving state information of the mobile terminal, and information generated by at least one sensor of the mobile terminal, and
   wherein determining whether the current place of the mobile terminal is the major place comprises:
   calculating, by the processor, a probability corresponding to the moving state of the mobile terminal and the visiting of the major place; and
   comparing, by the processor, the calculated probability with a threshold set for determining whether the current place is the major place.

2. The method of claim 1, wherein the information about the current place is stored by inputting of the user and includes at least one of a place name, a building name, and location information.

3. The method of claim 2, wherein the information about the current place further includes at least one of a service available to the user in the current place and a distance to an adjacent registered place.

4. The method of claim 1, further comprising outputting, by the touch screen, if the current place has not been registered, a request prompting input of information about the current place.

5. The method of claim 1, wherein the moving state information about the mobile terminal includes at least one of a speed, a direction, an acceleration, and Global Positioning System (GPS) information of the mobile terminal.

6. The method of claim 1, wherein the information generated by the at least one sensor of the mobile terminal includes at least one of an illumination, a gravity, a motion, an ambient sound, a wind force, a current time, a remaining battery amount, and a geomagnetic field.

7. The method of claim 1, wherein the user personal information includes at least one of a schedule, a text message, a call record, a diary, and schedule management.

8. The method of claim 1, wherein the determination as to whether the current place has been registered comprises comparing, by the processor, a first Identifier (ID) of a signal-transmitting device transmitting the at least one signal, included in the at least one signal with a second ID of a signal-transmitting device transmitting a signal in the registered place, and determining, by the processor, if the first ID is identical to the second ID, that the current place has been registered.

9. The method of claim 8, wherein the at least one signal includes at least one of a Global Positioning System (GPS) signal, a signal received from a Wireless Fidelity (WiFi) Access Point (AP), a Wireless broadband (Wibro) signal, a Bluetooth signal, and a signal received from a Radio Frequency Identifier (RFID) tag, and the at least one signal includes a strength of the signal and an ID of a device that transmits the signal.

10. A mobile terminal for controlling place recognition, the mobile terminal comprising:
    a sensor module configured to sense a state of the mobile terminal;
    a processor configured to collect at least one of state information representing the sensed state of the mobile terminal and user personal information stored in the mobile terminal, determine whether a current place of the mobile terminal is a major place that a user has previously visited at least a number of times using the collected information, and determine whether the current place has been registered using at least one signal received externally; and
    a touch screen configured to output, if the current place has been registered, information about the current place,
    wherein the state information includes moving state information of the mobile terminal, and information generated by at least one sensor of the mobile terminal, and
    wherein the processor is further configured to calculate a probability corresponding to the moving state of the mobile terminal and the visiting of the major place, and to compare the calculated probability with a threshold set for determining whether the current place is the major place.

11. The mobile terminal of claim 9, wherein the information about the current place is pre-inputted by the user and includes at least one of a place name, a building name, and location information.

12. The mobile terminal of claim 10, wherein if the current place has not been registered, the processor outputs a request prompting input of information about the current place.

13. The mobile terminal of claim 10, wherein the sensor module senses at least one of a speed, a direction, an acceleration, and Global Positioning System (GPS) information of the mobile terminal.

14. The mobile terminal of claim 10, wherein the user personal information includes at least one of a schedule, a text message, a call record, a diary, and schedule management.

15. The mobile terminal of claim 10, wherein the processor compares a first Identifier (ID) of a signal-transmitting device transmitting the at least one signal, included in the at least one signal with a second ID of a signal-transmitting device transmitting a signal in the registered place, and if the first ID is identical to the second ID, determines that the current place has been registered.

16. The mobile terminal of claim 15, wherein the at least one signal includes at least one of a Global Positioning System (GPS) signal, a signal received from a Wireless Fidelity (WiFi) Access Point (AP), a Wireless broadband (Wibro) signal, a Bluetooth signal, and a signal received from a Radio Frequency Identifier (RFID) tag, and the at least one signal includes a strength of the signal and an ID of a device that transmits the signal.

\* \* \* \* \*